United States Patent [19]
Yazawa

[11] 3,971,838
[45] July 27, 1976

[54] PROCESS FOR CONTINUOUSLY PRODUCING SHAPED ARTICLES OF POLYSTYRENE FOAM

[75] Inventor: Masahide Yazawa, Tokyo, Japan

[73] Assignee: Polymer Processing Research Institute Ltd., Tokyo, Japan

[22] Filed: Aug. 17, 1973

[21] Appl. No.: 389,406

[30] Foreign Application Priority Data
Aug. 18, 1972 Japan.............................. 47-82559

[52] U.S. Cl................................. 264/51; 264/234; 264/237; 425/4 C
[51] Int. Cl.².................................... B29D 27/00
[58] Field of Search.................. 264/47, 45, 51, 53, 264/54, 45.4, 234, 237; 161/159, 161; 138/149, 175, DIG. 9; 425/4 C

[56] References Cited
UNITED STATES PATENTS

| | | | |
|---|---|---|---|
| 2,962,407 | 11/1960 | Aykanian............................. | 264/47 |
| 3,118,800 | 1/1964 | Snelling............................. | 264/47 X |
| 3,144,369 | 8/1964 | Foord et al........................ | 264/47 X |
| 3,262,150 | 7/1966 | Morin................................. | 264/51 UX |
| 3,383,441 | 5/1968 | Norrhede et al.................. | 264/51 |
| 3,422,178 | 1/1969 | Junker et al...................... | 264/51 X |
| 3,427,372 | 2/1969 | Berner............................... | 264/51 |
| 3,488,411 | 1/1970 | Goldman........................... | 264/53 X |
| 3,594,461 | 7/1971 | Jacob................................ | 264/51 |
| 3,616,162 | 10/1971 | Noziere............................. | 161/161 X |
| 3,658,971 | 4/1972 | Schickedanz..................... | 264/47 X |
| 3,800,018 | 3/1974 | Charpentier...................... | 161/159 X |
| 3,895,086 | 7/1975 | Berner............................... | 425/4 C X |
| 3,917,439 | 11/1975 | Yovanovich...................... | 264/51 X |

FOREIGN PATENTS OR APPLICATIONS

| | | | |
|---|---|---|---|
| 1,522,869 | 5/1967 | France............................... | 264/47 |
| 1,180,049 | 6/1959 | France............................... | 264/53 |
| 1,281,677 | 2/1965 | Germany........................... | 264/51 |
| 116,694 | 5/1969 | Norway............................. | 264/45.4 |
| 400,275 | 4/1966 | Switzerland...................... | 264/45.4 |
| 965,185 | 7/1964 | United Kingdom............... | 264/47 |
| 1,105,422 | 3/1968 | United Kingdom............... | 264/47 |

*Primary Examiner*—Philip Anderson
*Attorney, Agent, or Firm*—Fred Philpitt

[57] ABSTRACT

Flat plate-type, rod-type or shaped articles of polystyrene foam are continuously produced from preliminarily expanded beads of polystyrene or a mixture of said preliminarily expanded beads with foamed polystyrene pieces recovered for reuse as raw materials by enveloping the beads with a circulating steam-permeable belt, such as cloth belt, passing the enveloped beads through a pressure sealing conduit capable of throttling and succesively a heating zone in a pressure steam chamber at a temperature between 100° and 125°C, thereby softening and re-expanding the preliminarily expanded beads by steam heating, reducing the apparent volume of the enveloped re-expanded beads in a course towards a pressure sealing conduit at an outlet of the pressure steam chamber, thereby allowing the softened and re-expanded beads to adhere tightly one to another in a continuous foamed mass, or also additionally to a liner material, when accompanied therewith, cooling the enveloped foamed mass while maintaining a limited volume of the enveloped foamed mass, and separating the resulting shaped product of foamed mass from the belt by a set of rollers at the end of processing line.

7 Claims, 9 Drawing Figures

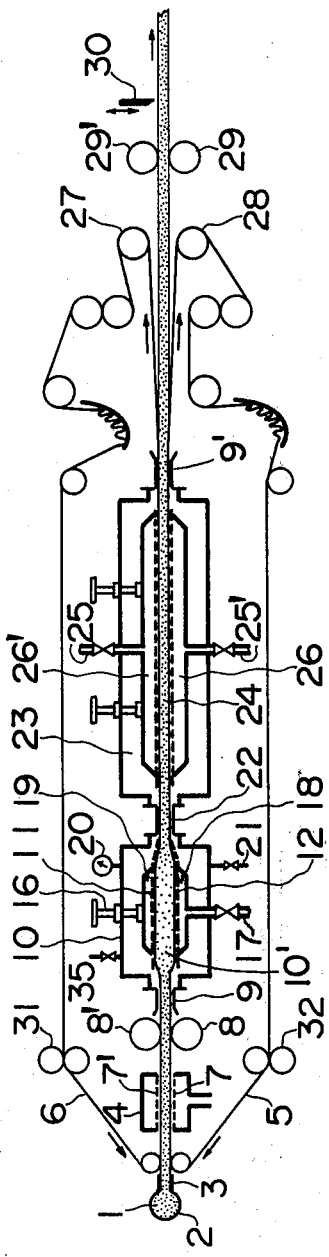
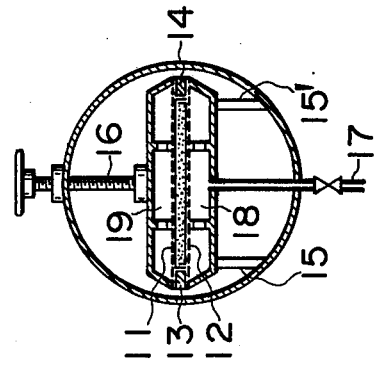
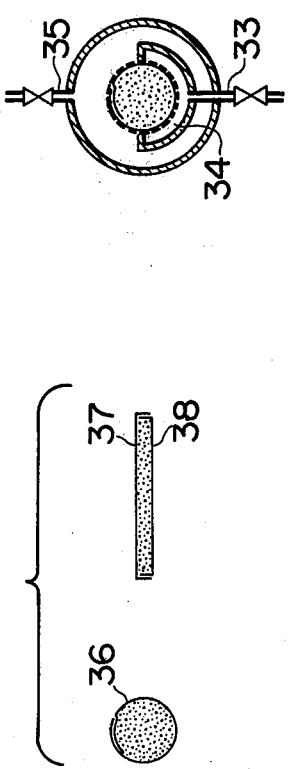

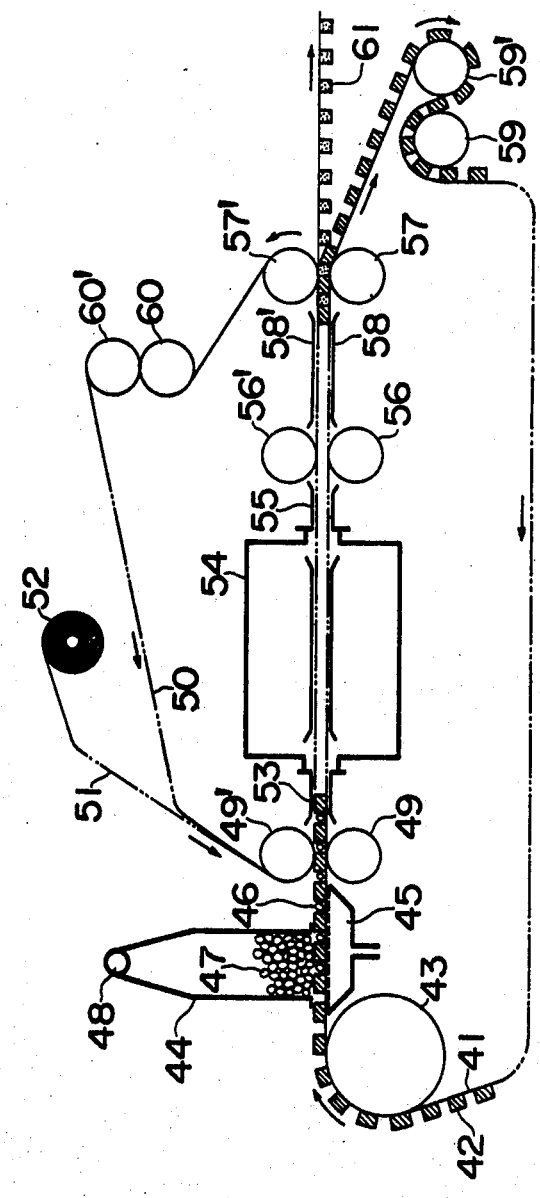

PROCESS FOR CONTINUOUSLY PRODUCING SHAPED ARTICLES OF POLYSTYRENE FOAM

BACKGROUND OF THE INVENTION

This invention relates to a process and apparatus for continuously producing flat plate-type, rod-type, or shaped products from preliminarily expanded beads of polystyrene or a mixture of said beads with foamed polystyrene pieces recovered for reuse as raw materials, and more particularly to a process and apparatus for continuously producing shaped foamed articles, which comprises enveloping preliminarily expanded beads as raw materials with a circulating steam-permeable belt or belts, preferably cloth belts, passing the enveloped beads through a pressure sealing device composed of a tubular passage capable of squeezing and successively through a heating zone in pressure steam chamber at a temperature between 100° and 125°C, thereby softening and re-expanding the beads by steam heating, reducing an apparent volume of the enveloped re-expanded beads in a course towards another pressure sealing device at an outlet of the pressure steam chamber, thereby allowing the softened and re-expanded beads to adhere tightly one to another in a continuous foamed mass, or also additionally to a liner material if the eveloped beads are accompanied with liner material, cooling the enveloped foamed mass while maintaining a limited volume of the enveloped foamed mass, and separating the resulting shaped products of re-expanded beads from the belt by a set of rollers at the end of processing line.

The enveloped mass are generally a continuous mass in a flat plate or rod state in the processing steps. When the enveloped mass is cooled while maintaining its limited volume, and when a product having a small thickness, for example, a thickness of 10 mm or less is to be produced, a force of expanding pressure of the beads to press the belt to the outside is small, and therefore a sliding resistance is also small in the passage of the belt. Also, as cooling can be carried out rapidly, it can be effected in the atmosphere. However, when thickness of product increases from 15 mm to 100 mm, cooling is slowly carried out in proportion to the square of the thickness, and a distance required for the cooling is prolonged. The belt is more strongly pressed to the wall surface of the passage by the pressure of re-expanding and the sliding resistance of the belt sometimes exceeds the limit of strength of the belt. To carry out the cooling effectively even in said latter case, the pressure sealing device at the outlet of the pressure steam chamber is directly connected to a pressurized cooling chamber in the present invention, and the pressure of re-expanding is suppressed by applying a pressure to the cooling water or air of the cooling chamber, thereby controlling the sliding resistance of the belt to within the limit of the strength of the belt. Further, according to the present invention, a pressure sealing device is provided also at the outlet of the pressure cooling chamber to effect pressure sealing. Furthermore, according to the present invention, a plurality of flexible female molds of elastomer are provided in parallel on and along one of two cloth belts enveloping preliminarily expanded beads from upside and downside, to continuously form individually independent shaped male articles in the respective female molds.

According to the conventional, well-known process for continuously producing boards of foamed polystyrene based on pressure steam heating, preliminarily foamed beads of polystyrene are inserted between two steel belts having small steam-permeable perforations and spaced by fixed side walls of predetermined height on both edges, subjected to heat shaping by passing steam therethrough from a pressure steam chamber behind the belt surfaces, cooled as the foamed mass is in the inserted state and cut into a predetermined shape. In said well-known art, both side edge parts of the steel belts are open to the atmosphere, and the pressure steam sealing is carried out behind the belt surfaces. The belts are liable to meander in a zigzag manner. Once the belts meander in the zigzag manner, the pressure steam sealing is deteriorated, resulting in occurrence of much steam leakage. The present invention is distinguished from the prior art in the sealing mechanism. In the prior art, the processing is carried out while holding the beads inserted between the belts at a constant distance throughout all the steps of heating and cooling, whereas in the present invention the thickness of the beads within the tubular passage of pressure sealing devices at the inlet and outlet of the pressure processing chambers as well as the distance of two belts within the pressure steam chamber and the pressure cooling chamber are not always constant. In the present invention, thickness of the foamed beds sandwiched between the two belts namely the distance of the two belts passing through each part of processing is adjusted, unless the thickness and density of the final shaped product are adversely influenced thereby, mainly to make a tension on the cloth belts as small as possible and reduce the sliding resistance of the cloth belts. Therefore, the present invention is also distinguished from the prior art in changing the distance of two belts from one step to another. Furthermore, the use of pressure water in cooling in the present invention considerably increases the shaping speed, and the provision of a plurality of female molds in parallel and in series on and along one of the belts ensures a continuous production of individually independent shaped articles, and the use of flexible cloth belts is also characteristic of the present invention.

When warped yarns arranged in parallel, or rough non-woven fabrics of particularly a mesh of small numbers, made from split fiber webs, parallel yarns, parallel tapes, laid one upon another cross-wise, are used as a liner material together with the preliminary expanded beads, the heated and re-expanded beads are laminated on the liner material so as to enclose the fibers, yarns or tapes of the liner materials into a skin part of the foamed products, and a tight adhesion of the foamed mass to the liner is much improved thereby. Liner materials such as paper, film, etc. have not a good steam permeability, and particularly paper is weak against water, and thus laminated onto one side or both sides of products after the shaping in the heretofore well known manner.

The present invention will be described in detail by way of the accompanying drawings.

BRIEF DESCRIPTION OF THE DRAWINGS

FIGS. 1 a, b, c, d are schematic views showing a process of one embodiment of the present invention.

FIG. 1a shows a cross-sectional view along the longitudinal direction,

FIG. 1b shows forms of a belt or belts enveloping preliminarily expanded beads in a circular state or a flat-plate state.

FIG. 1c shows a cross-section of a part, where pressure steam is passed through a circular rod-type envelope.

FIG. 1d shows a cross-section of pressure steam or cooling water processing part in the case of a flat plate-type shaped articles.

FIGS. 2 a, b are schematic views of embodiments of the present invention showing a process for continuously shaping a plurality of independent shaped articles.

FIG. 2a is a schematic view of a raw material-charging section and shaped product-withdrawing section especially in an enlarged scale in case of production of waddings or buffer materials, etc. where small but slender, independent foamed articles adhering to a liner material in spaced relationship are produced continuously.

DETAILED DESCRIPTION OF THE DRAWINGS

Figure 2B:
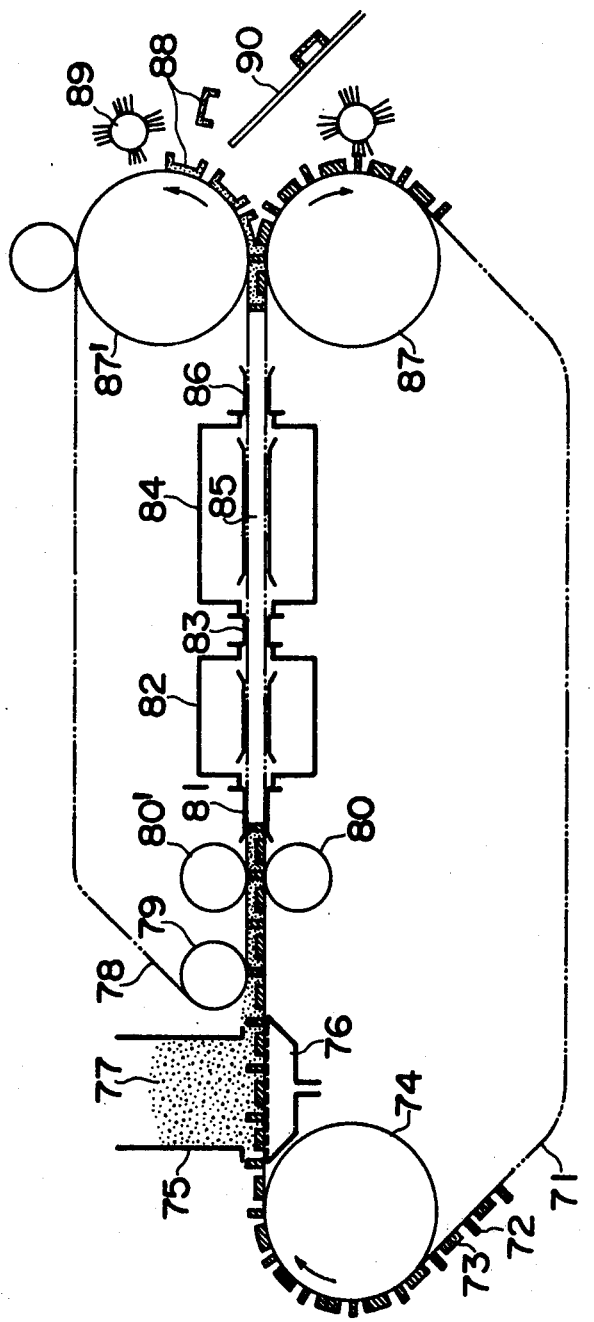
FIG. 2b is a schematic view of a raw material-charging section and a shaped article-withdrawing section particularly in an enlarged scale, where somewhat larger shaped articles, which are independently usable, are continuously shaped within female molds on a circulating belt.

In FIG. 1a, there is schematically depicted a process for producing flat plate-shaped product from a section of enveloping raw materials with circulating belts of cotton cloth having a weight per unit area of 150 to 250 g/m$^2$ in case of articles of large thickness or of 300 to 400 g/m$^2$ in case of articles of large thickness through a pressure steam heating chamber, a pressure cooling chamber (atmospheric pressure for the articles of small thickness) to a section of separating the shaped product from the belt and withdrawing the product by a set of rollers at the end, and in FIGS. 1b, 1c and 1d there are shown cross-sectional views of the parts of the process as shown in FIG. 1.

As the polystyrene preliminarily expanded beads as the raw material for the present process, preliminarily expanded beads prepared from expandable beads of polystyrene obtained generally by incorporating a low boiling fraction of petroleum hydrocarbons as a foaming agent into small particles of styrene polymers obtained by pearl polymerization of styrene followed by steam-heating at about 100°C to obtain particles of a diameter of 3 to 8 mm and an apparent density of 0.1 to 0.015 (corresponding to the socalled foaming ratio of 10 to 66) or a mixture of the abovementioned beads of polystyrene with reclaimed expanded grains recovered for reuse can be employed. Preliminarily expanded beads 1 as the raw material are pneumatically conveyed through pipe 2 and funnel 3 to a negative pressure charging chamber 4. Two cloth belts 5 and 6 are introduced along the outer periphery of the funnel into the negative pressure charging compartment. The belts pass along and in contact with the inside surface of perforated walls in the negative pressure charging compartment. The preliminarily expanded beads charged from funnel 3 are accumulated between the belts by filtration through the perforated walls. The accumulated beads are pressed between pinch rollers 8 and 8', while maintaining a desired width by edge guide plates, and successively led to pressure steam chamber 10 through pressure sealing device 9 at the inlet of the pressure steam chamber. Within the heating zone 10' in a pressure steam chamber 10, the preliminarily expanded beads are made to expand to a height having relation to the thickness of a desired product by means of distance pieces 13 and 14 at both edge parts of perforated plates 11 and 12, as shown in FIGS. 1a and 1d. Lower perforated plate 12 is fixed to the chamber wall at the lower side by means of supports 15 and 15', and upper perforated plate 11 is pressed down onto the distance pieces by means of pressing shaft 16 which can be variably elevated or lowered from outside atmosphere in accordance with the thickness of the desired product. Pressure steam is led to steam box 18 provided below lower perforated plate 12 through pipe 17, and passed through the perforations on the plates 12 and the belt to heat the pre-expanded beads. Then, the pressure steam is passed through the upper box 19 over upper plate 11 and retained in pressure steam chamber 10, where the temperature is kept constant by pressure regulator valve 20. Resulting drain is discharged to the outside through pipe 21.

Within the pressure steam chamber, the preliminarily expanded beads are heated to re-expand, and when upper perforated plate 11 and lower perforated plate 12 are kept at a suitable distance to provide clearances between individual beads even if the diameters of the beads are enlarged, all the beads can be uniformly and completely heated within a very short time such as 5 to 10 seconds, irrespective of the thickness of filled layer, which has relation to the thickness of the shaped product, because the heating time is a time necessary for heating the individual beads. When the upper and lower perforated walls are made to approach each other in the course towards the pressure sealing device at the outlet side of the pressure steam chamber, as shown in the drawing, the individual beads, which have been heated, softened and re-expanded, are pressed to adhere to each other and to eliminate any clearance among the beads and consequently a continuous foamed mass, composed of beads which adhere closely to each other, can be obtained.

Figure 3A:
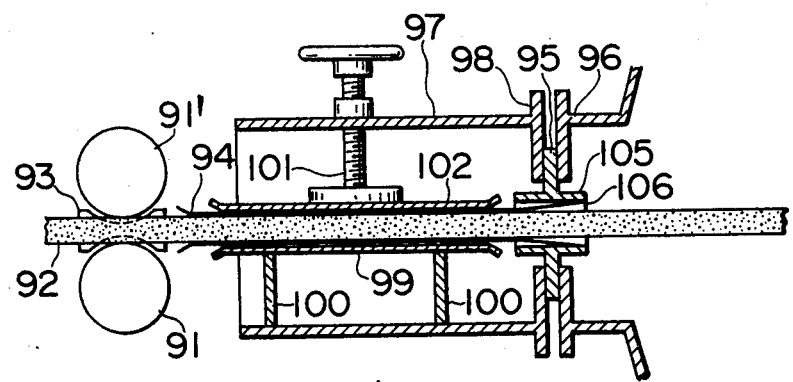
FIG. 3a is a longitudinal cross sectional view along the device, FIG. 3b a cross-sectional view across the device which is in the form of a flat tubular passage of small thickness capable of squeezing, and FIG. 3c a cross-sectional view of the device in case where the passage is of gate valve type.
Figure 3B:
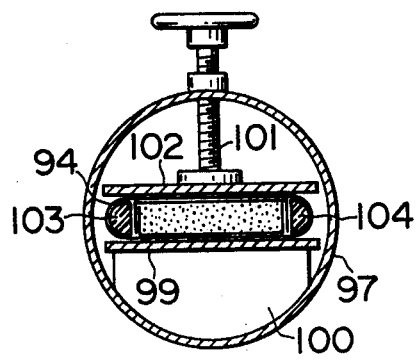
FIGS. 3 a, b, c are schematic views of a pressure sealing device for materials to be processed, in running, which are used in the present invention.

The upper and lower walls of the pressure sealing device shown in FIGS. 3a and 3b are arranged at a distance necessary for suppressing a steam leakage and a flow of the foamed mass due to a difference in pressures between inside and outside of the pressure steam chamber. The thickness and density of shaped products depend mainly upon cooling under a restricted volume in the cooling step. When a pressure is applied to a cooling fluid of the cooling chamber, and the shaped products are exposed to the atmospheric pressure on leaving the cooling chamber, the shaped articles are apt to expand particularly in the thickness direction. Thus, the pressure of the cooling fluid in the cooling chamber is so controlled that the shaped articles can have the desired thickness after the expansion in the open air.

In case of articles having a small thickness, such as 4 to 6 mm, cooling can be carried out with ease. After the foamed mass has left the pressure steam chamber, the mass is cooled in the atmosphere while keeping the upper and lower walls of the passage in the atmosphere at a constant distance. In that case, the sliding resistance of the passage for the cloth belts is not so high that the foamed mass can be cooled in the atmosphere as it is, while keeping the foamed mass at the desired thickness. However, with the increase of the thickness, for example, from 15 to 50 mm, a pressing pressure of the foamed mass upon the walls of the passage for belt is increased owing to a higher pressure of expansion of the foamed mass just after the mass has left the pressure steam chamber, and also the cooling time is prolonged. That is, a distance to the point of complete cooling is prolonged. In that case, the sliding resistance is increased within the passage for the belt, and thus pressure sealing device 22 at the outlet of the pressure steam chamber is directly connected to pressure cooling chamber 23, as shown in FIG. 1a, and the foamed mass is made to pass through passage 24 of limited volume in the pressure cooling chamber. At that time, the pressure of a cooling medium (water in many cases) is made to almost equal to or a slightly smaller than the expanding pressure to prevent the belt from being pressed strongly on the walls of the passage. The sliding resistance of the belt can be reduced thereby. The expanding pressure is decreased with the progress of cooling, and therefore the upper wall of the passage is made to have an inclination, so that the distance between the upper and lower walls may be narrowed towards the outlet of the pressure cooling chamber. Such a structure is effective for the cooling of foamed mass having a large thickness. The upper and lower walls of the passage of the cooling zone 24 in the pressure cooling chamber have a cross-sectional structure almost identical to those of the passage of the pressure steam chamber, as shown in FIG. 1d, but the cooling medium is supplied from pipes 25 and 25' and passes through and along upper box 26' and lower box 26 sandwiching the travelling shaped articles in a concurrent or counter-current direction relative to the travelling shaped foamed mass for cooling and is led into the vacant space in the cooling chamber. The cooling medium is then retained in a cooling chamber and discharged under a constant pressure.

The shaped foamed mass is led to the atmosphere through the pressure-sealing device 9' at the outlet of the cooling chamber when the outer layer part of the shaped foamed mass is solidified, but there still remains a force of expansion at the center part thereof. The upper belt is pulled by a number of rollers after passing around roller 27, and the lower belt is also pulled by a number of rollers after passing around roller 28, and the shaped articles are released from the upper and lower belts thereby. The released shaped product is withdrawn through between pinch rollers 29 and 29'. Shaped product having a large thickness is cut to a definite length by cutter 30. Shaped product having a small thickness is wound up, though not depicted. The upper belt is returned to the inlet side through rollers 31, and the lower belt also to the inlet side through pinch rollers 32.

In FIG. 1c, a cross-section of the passage of a circular rod-type shaped article through the steam chamber is depicted. Steam is passed through chamber 34 from pipe 33 upwards, and air replacement can be carried out with ease. The air retained in the pressure steam chamber is vented from pipe 35.

In FIG. 1b, one sheet of circulating belt 36 is used to envelope the foamed mass with more than one turn, i.e. with overlapping, in case of circular rod-type shaped articles.

In FIG. 1b, two upper and lower belts 37 and 38 are bent at right angles at their edge side parts to overlap one upon another and form enveloping belts in case of plate-type shaped foamed mass.

Steam permeates through between individual preliminarily expanded beads, thereby the heating of the beads is carried out in a very short time, as described above. The pressure steam chamber has a short length, but the cooling chamber has a prolonged length, because the cooling proceeds from the outer periphery of the shaped foamed mass, the foamed mass has a poor heat conductivity and thus the cooling requires a long period of time. In case of shaped foamed mass usually having a thickness of 20 to 50 mm, the cooling chamber is more than three times as long as the pressure steam chamber, even if the pressure cooling chamber is based on water cooling. Therefore, if the length of the pressure cooling chamber is fixed the travelling speed is made lower in case the shaped foamed mass has a larger thickness than that of the designed speed, and the travelling speed is made higher in case the shaped mass has a smaller thickness. Of course, control of cooling is sometimes carried out by adjusting the temperature or supplying rate of cooling water.

To seal a pressure of 1 kg/cm$^2$ gauge, it is sufficient that the length of squeezing part of the sealing device as shown in FIG. 3a is usually 10 to 20 cm, but the length is prolonged if the shaped foamed mass has a larger thickness.

When a liner material such as warped and sized yarns arranged in parallel at a pitch of 3 to 20 mm, a non-woven fabric having square lattices of 3 to 10 mm in length, prepared by laminating parallel yarns in a crossing manner, a non-woven fabric of coarse webs of split fibers, laid one upon another in a crossing member, etc. is supplied together with the preliminarily expanded beads along the inside surfaces of the upper and lower belts in case of preparing a flat plate-type foamed mass, the foamed mass fills the lattices so as to envelope the fibers or yarns, and thus the fibers or yarns tightly adhere to the foamed mass. In that case, a foamed mass reinforced with the fibers or yarns can be obtained.

When a non-woven fabric of glass fibers is laminated onto the foamed mass, the resulting article has a good dimensional stability, and thus can be used as a light building material. The fiber-reinforced articles having a thickness of about 10 mm are suitable as a materials for "Fusuma", sliding screen door for Japanese architecture, and the fiber-reinforced articles having a thickness of about 30 mm are suitable as a core material for "Tatami", a kind of straw mat for Japanese architecture or for furnitures.

When an emboss roller is applied to the articles laminated with a coarse non-woven fabric of glass yarns at a temperature of 150°C or higher, the foamed mass yields at the parts where projections of the roller press, though the glass yarns undergo no change at these parts. Thus, gypsum or mortar is easy to be retained at these concave parts through the lattices of the glass yarns, and a rigid coating can be obtained thereby. That is, the embossed articles are not only suitable as a building material as a substitute of light gypsum board or slate, but also convenient for fire- or flame-retarding processing of the building material of glass fiber-reinforced foamed mass at building site.

The articles obtained according to the foregoing process of the present invention are circular rod-like products or flat plate-like products, and rod-like articles or board plates having any diameter or thickness in a range of 10 to 100 mm can be prepared. Furthermore, when a single particle layer of preliminarily expanded beads of polystyrene of 3 to 8 mm in diameter is inserted between the upper and lower belts and subjected to pressure steam heating, a flat sheet material having a thickness of 3 to 5 mm can be obtained. The beads can be supplied to the belt and laid in a single particle layer on the belt by (i) making the beads electrostatically adhere onto one side of dry belt, or (ii) making the beads stick to a surface of wet cloth belt in a single particle layer by surface tension of water.

When there are provided projections on any of the upper or lower sandwiching belt, where no beads are filled, for example, when there are projections of circular spot patterns on an elastomer of the lower belt, even though the shaped sheet is not fully filled with the foamed mass, the resulting shaped foamed mass will be a sheet having patterns of circular spot concaves or perforations communicating a front side to a back side of the foamed sheet (voids) in a direction of the thickness. If the foamed sheet has such a percent of concave parts or perforations in volume as 50%, a buffer material having the same thickness as that of the sheet having no concave or perforations can be obtained from one-half of the raw material in amount. Thus, the resulting articles will be advantageous in that they are lighter and cheaper.

When a rough scrim prepared by laying glass fibers one upon another in a crossing manner is laminated on both sides of said plate-like foamed mass of an appropriate thickness having the concaves or perforations, and coated with cement mortar, gypsum, etc., and solidified so as to fill the concaves or perforations and coat the plate surface, solidification takes place integrally on both sides of the plate through the concaves or perforations. The resulting building material is tough, light and effective for thermal insulation and noise abatement. The mortar coating and filling can be also carried out at building site. The foamed sheets of a thickness of 3 to 6 mm having the perforations are a suitable buffer material in respect to its low cost, light weight and flexibility.

According to the foregoing process of the present invention, an entirely continued, that is, endless product can be obtained, irrespective of the presence of perforations in the product.

Continuous production of discontinued, that is, individually indpendent shaped articles of foamed mass according to the present invention will be described below.

In FIG. 2a, it is shown that preliminarily expanded beads are heated, re-expanded and processed in a unit of single particle or several particles or in a unit of parallel rows of single particle. The resulting shaped articles are very small or slender in shape, and are connected with one another by means of a liner material and can be used as a buffer material like a corrugated board.

Slender, tooth-typed foamed masses having cross-sections of 3 to 10 mm square, formed in the tooth molds laterally arranged on the belt, serve as a buffer material. At the shaping, yarns arranged in parallel in a pitch of 10 to 30 mm are laminated on the foamed mass in a longitudinal direction as a liner material, and the product foamed articles adhering to the parallel yarns in series so as to cross the yarns at constant distances can be obtained from the end of the processing line, as shown in FIG. 2a.

In that case, rectangular projections 42 of elastomer having a cross-section of 3 to 10 mm square are provided crosswise at almost equal distances onto lower, steam-permeable cloth belt 41 to form a tooth-type, female belt. While the belt travels in a horizontal direction through over guide rollers 43, preliminarily expanded beads 46 having an apparent specific gravity of about 0.02 to 0.05, and a diameter less than the distance of neighbouring tooth of the elastomer female mold, are filled in the cavity of the female mold between one tooth and another, in most cases, in a row of single beads in one cavity in a lateral direction of the belt, that is, a direction perpendicular to the surface of the drawing, with each beads in contact with other in the cavity (female mold), when the bottom of silo 44 is open to the lower belt and suction chamber 45 is provided below the lower belt. Of course, a row of two or more particles can be filled in one cavity in a longitudinal direction of the belt, especially when the beads have a smaller diameter. However, the preliminarily expanded beads obtained from ordinary commercially available expandable beads of polystyrene have diameters of almost uniform sizes in a range of 3 to 8 mm, though dependent upon preliminary foaming condition, and thus a row of single particle in a lateral direction of the belt can be filled in one cavity (female mold) between one tooth and another, upon selection of a proper diameter of the beads. Of course, in case of smaller ones, about two rows of them can be filled in one cavity (female mold) of the belt. At that time, vibration of the belt is an effective means for uniform filling.

Raw material preliminarily expanded beads 47 are supplied to silo 44 through pneumatic conveyor pipe 48. The upper surface of the lower belt is scraped by a wall end of the silo, and thus the beads are filled in each cavity of the female mold in one row of single beads in such a manner that the top of the filled beads is slightly above the top of the mold. Upper circulating belt 50 of steam-permeable cloth is guided over roller 49' and the beads on the lower belt are sandwiched between the upper belt and the lower belt. The beads sandwiched between two belts are pinched between pinch rollers 49 and 49', and introduced into a pressure sealing device at an inlet side of a pressure steam chamber. The pressure sealing device is located near to pinch rollers 49 and 49'.

Parallel fiber materials 51 warped at a pitch of 10 to 30 mm in a lateral direction and sized are guided as a liner material onto the upper belt from beam 52, inserted below the upper belt but along and above the beads at a position of pinch rollers 49 and 49', and made to travel together with the belt and the beads. The beads are passed through pressure sealing device 53 at the inlet into pressure steam chamber 54, heated therein for 5 to 10 seconds, passed through pressure sealing device 55 at an outlet, taken out into the atmosphere, and cooled between a pair of pinch rollers 56 and 56' and another pair of pinch rollers 57 and 57', while repressing an expansion of the foamed mass between pinching plates 58 and 58'. When the lower belt is withdrawn through pinch rollers 59 and 59', and the upper belt is withdrawn through pinch rollers 60 and 60' at the same speed, the preliminarily expanded beads undergo re-expansion in the molds, and the beads within each mold tightly adhere to one another, and at the same time fill the mold almost fully while passing through the pressure steam chamber. At that time, the foamed masses enclose the parallel yarns at its upper end and tightly adhere thereto. Consequently, shaped product 61, in which each of the rectangular rod-like foamed articles tightly adheres to the parallel yarns so as to cross them, can be withdrawn from the end of the processing line. The resulting articles of foamed mass are continued only in a longitudinal direction only by means of the parallel yarns, and are thus very flexible and can be wound up with ease.

To prevent the sizing agent of the parallel yarns from sticking to the upper belt, the upper belt must be made from fiber materials having a poor adhesiveness with the sizing agent or must be coated with a releasing agent so that steam permeability may not be lost.

When the parellel yarns as the liner material are passed not along the upper sides of the female molds, but along the bottom sides of the female molds, it is easier to withdraw shaped articles 61 from the female molds. For this purpose, narrow slits are provided on the tooth projections down to the bottoms of the molds at pitches of 20 to 30 mm in a lateral direction of the belt, and the parallel yarns are supplied to the slit bottoms tangentially over guide roller 43. Articles 61, in which the parallel yarns adhere to the lower side of the tooth-shaped foamed masses, that is, the side opposite to that shown in FIG. 2a, can be continuously withdrawn with easy release from molds.

Even if a sizing agent of polyvinyl acetate type is applied to the yarns as an adhesive, the yarns can tightly adhere to the lower side of tooth-shaped foamed masses through their skin parts without any adhesion of the parallel yarns to the cloth belt according to said procedure.

The resulting shaped products can be used as a buffer material as such, but when an adhesive is applied to one side or both sides of the articles, and dried, and further a liner paper is fixed on the one or both sides of the articles by heat pressing, a substitute for corrugated board with one side liner sheet or two side liner sheet can be obtained.

Further, when a non-woven fabric of staple fibers is used as two-side liner materials, a good filter medium can be obtained. That is, it is desirable that a filter medium can serve to retain a voluminous thicker layer of cakes rather than a plane thin and compact cake layer. In the filter medium prepared according to the present invention, two non-woven fabric filter media are provided apart at a distance by means of elastic foamed materials, and thus the filter medium functions to give voluminous filter cake. That is, good filter medium with less clogging can be obtained. The filter medium can be prepared by using a non-woven fabric as a liner material in place of the parallel yarns in FIG. 2a, and the non-woven fabric can tightly adhere to the foamed masses in the step of re-expansion and pressing of the foamed masses.

When a belt prepared by pasting an elastomer sheet having circular spot perforations onto substrate cloth is used as a lower belt, and a non-woven fabric prepared by laying split fibers or yarns in a crossing manner, non-woven fabric of staple fibers, paper, film, etc. are sized and used as the liner material, buffer materials, in which re-expanded beads tightly adhere in circular spots pattern to one side of the liner material can be obtained at the end of the processing line. In that case, the thickness of the elastomer sheet is almost equal to the diameter of the preliminarily expanded beads, but the diameter of the perforation is made sufficiently larger than the diameter of the preliminarily expanded beads. When an elastomer sheet capable of being pressed to less than one-half of the original thickness, such as a sponge rubber sheet, is used, the beads turn to flattened, circularly re-expanded beads having a diameter about two times the original diameter, and adhering area to the liner material is increased, resulting in tightly stabilized adhesion. The resulting products having circular flattened re-expanded beads on one side thereof or, if necessary, products having liner materials on both surfaces obtained by laminating another liner material on another side to sandwich the foamed masses, have a thickness ½ to ⅓ as large as the diameter of the raw preliminarily expanded beads, and their respective flattened, foamed small masses are independently scattered on the liner materials even after the shaping. Therefore, the products have a very good two-dimensional flexibility, and can be used as thin buffer materials, heat-insulating materials or filter materials.

In FIG. 2b, continuous production of individually independent shaped articles having a larger size than that of the foamed articles as shown in FIG. 2a, and capable of being independently used as such, is depicted. That is, the lower belt is prepared by pasting thick elastomer belt having many concave or perforation parts, which can serve as the desired cavity of female molds and are arranged closely to each other onto a cloth belt. The preliminarily expanded beads are filled in the female molds and subjected to steam heating, re-expansion, and shaping whereby individually independent male shaped articles can be prepared in succession in the individual female molds. In FIG. 2b, the raw material-filling section and the shaped article-withdrawing section are shown particularly in an enlarged scale. According to the process as shown in FIG. 2b, rectangular or circular boxes having a height of about 10 to 100 mm, or individually independent shaped articles having a concave or convex part of various shapes can be prepared in succession at a low cost in mass production manner.

In FIG. 2b, an elastomer plate having a number of cavities of female molds having elastomer projection 73 therein is pasted onto lower belt 71. That is, the female mold is composed of cloth belt 71, side walls 72 and projection 73. While the lower belt travels horizontally through guide roller 74, and passes under the open bottom part of silo 75 for raw material of preliminarily expanded beads of polystyrene, beads 77 fill the female molds fully by the falling of the beads from the silo by gravity and if necessary by a suction from suction box 76 provided below the belt, and excess beads are scraped off by the silo wall end. Upper circulating cloth belt 78 is laid upon the filled molds through guide roller 79, and the beads sandwiched between the upper belt and lower belt are passed through pinch roller 80 and 80' and pressure sealing device 81 into pressure steam chamber 82, heated therein for about 10 seconds, re-expanded to a limited volume of the mold and passed through pressure sealing device 83 at an outlet into cooling chamber 84. In a passage of limited volume within cooling chamber 84, air cooling is carried out in case of articles of a small wall thickness, and water cooling is carried out under pressure in case of articles of a large wall thickness. Then, the foamed masses are passed through pressure sealing device 86 at the outlet and then through between guide rollers 87 and 87', and the resulting shaped articles 88 sticking to the upper cloth belt are scraped away from the belt surface through contact with revolving scraper 89 and made to fall onto receiver 90. If the shaped articles are encased in the female molds on the lower elastomer belt, the shaped articles are individually released from the female molds by a scraper similar to that 89 or an impact pusher from the back side of the belt, not shown in the drawing, at the position where the belt changes the travelling direction thereof on roller 87 and openings of the female molds at the upper side are made wider. The shaped articles are made to fall onto a receiver, and the upper and lower belts are circulated to the inlet side, respectively.

The shaped articles obtained according to the process of FIG. 2b have a height of about 10 to 100 mm and a wall thickness of about 3 to 20 mm, and are suitable as various vessels and vessel covers. Annular plates of polystyrene foamed mass for protecting both edges of bobbins for artificial fibers or spun fibers, widely used in recent years, can be prepared continuously at a low cost according to the present invention.

In case of boxes where the tops or bottoms are flat, a web of split fibers or non-woven fabric prepared by laying parallel yarns in a crossing manner, or paper is laminated onto the tops or bottoms of boxes as a liner material and made to tightly adhere thereto. When lining parts of the liner materials to the shaped articles, which are prepared through adhesion to the liner materials, are cut off, box-shaped articles, whose tops or bottoms are reinforced with the liner material, can be obtained. The shaped articles reinforced with the liner material can be repeatedly used without discarding as a waste.

Figure 3C:
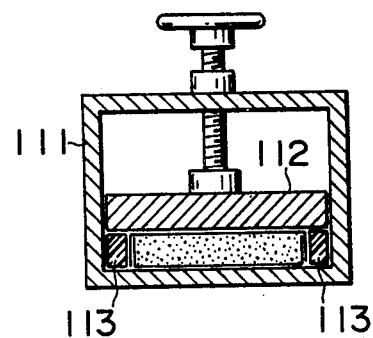

In FIGS. 3a, 3b and 3c, pressure sealing devices usable in the present invention at the inlet and outlet of the pressure steam chamber or at the outlet of the pressure cooling chamber directly connected to the pressure steam chamber are depicted.

In FIG. 3a, a cross-section of the pressure sealing device in a longitudinal direction, which controls a cross-sectional area of opening of the tubular passage by change in distance between upper and lower walls is shown. In FIG. 3b, a lateral cross-section of the pressure sealing means, where packing materials capable of varying a cross-sectional shape are inserted at both edge parts of the tubular passage, is shown. In FIG. 3c, a lateral cross-section of the pressure sealing device, where packing materials are inserted at both edge parts of a gate-type passage, a kind of the throttle pipe, is shown.

The preliminarily expanded beads enveloped with the circulating belts at the inlet of the pressure steam chamber are pressed between pinch rollers 91 and 91'. At that time, side walls 93 are provided at both edge parts to prevent the width of foamed mass 92 from lateral extension. Such provision is necessary especially for the products having a large thickness. The presence of the pinch rollers serves to prevent the beads enveloped within the belt finally from flowing backwardly through the belt by the push of pressure steam. In a principle, the flow of the beads must be prevented by adjusting the cross-sectional area of the opening of the tubular passage, but the presence of such pinch rollers assures complete control of the flow of beads without any failure at the initial stage of control.

Tubular passage 94 is fixed to flange 95 inserted between flange 96 of the pressure steam chamber and flange 98 of pipe 97 for supporting pressure-resistant pinch plates of the tubular passage, and lower pinch plate 99 is fixed to pipe 97 by means of supports 100. The cross-sectional area of the opening is adjusted by pinching tubular passage 94 between the lower pinch plate and an upper pinch plate capable of being moved vertically by means of pressing shaft 101. Packing materials 103 and 104, whose cross-sections are variable, are inserted at both edge parts of the tubular passage, as shown in FIG. 3b, and their front and back ends are fixed. The packing materials prevent pressure leakage at both end parts of the tubular passage through their deformation corresponding to the deformation of the tubular passage. Packing materials, prepared by wrapping the outside of a bundle of parallel yarns or sponge mass containing isolated pores with a thin film of fluoring resin containing glass fibers, are suitable in the present invention.

The right end of tubular passage 94 is welded tightly to right end part 106 of shield pipe 105 fixed to flange 95, and its welding position should be located far from the squeezing part of the thin wall tubular passage, and therefore the tubular passage can be freely deformed by squeezing corresponding to the adjustment of a distance between the pinch plates. The part from the position of welding to the pinch plates is of such a structure that shield pipe 105 supports the tubular passage from outside as a pressure-resistant sheath.

The pressure sealing device provided at the outlet of the pressure steam chamber has almost identical structure to that of the pressure sealing device at the inlet, but is mounted so that direction of pass of the foamed mass is opposite. When the pressure steam chamber is directly connected with the pressure cooling chamber, these chambers have almost equal pressures in most of the cases in the present invention. Even if there is a difference in pressure between these chambers, the difference is very small, and thus the tubular passage of the pressure sealing device can serve to prevent mixing of steam and water.

A pressure sealing device of the present invention is used at the outlet of the pressure cooling chamber.

When the desired shaped articles are of a circular or oval cross-section, the foamed mass can be readily deformed in accordance with the deformation of the tubular passage of the sealing device, and in most of the cases it is not necessary therefore to insert the packing materials at edge parts, but in the case of the flat plate-shaped articles, it is absolutely necessary to insert the packing materials at the edge parts.

When stainless steel sheet of small thickness such as 0.2 to 0.5 mm is used as the walls of both edge parts of the tubular passage, the walls can well withstand a processing pressure of 0.5 to 1.5 kg/cm$^2$ for re-expanding the beads at the edge parts of the passage for processing flat plates having a thickness of 100 mm or less.

The use of a tubular passage having thin walls at the edge parts assures a free, reversible deformation of thin walls, even if the thickness of the desired shaped article is varied, and therefore even only one pressure sealing device can produce shaped articles having a wide range of thickness. Furthermore, even for the shaped articles of equal thickness, a tension to the belt can be advantageously adjusted to a slightest degree.

In FIG. 3c, another type of the tubular passage, i.e. a gate valve type, is depicted. In gate 111 of desired dimension, sealing plate 112 capable of moving vertically therein with a good air tightness is provided to form a flattened opening between the gate bottom plate and the sealing plate. Packing materials 113 are inserted at both edge parts of the opening, and front and back edges of the packing materials are fixed. The resulting structure can be used as a tubular passage in the same manner as shown in FIG. 3b, but this type of structure is high in equipment cost.

Hereinbefore, descriptions are mainly concerned with polystyrene foamed mass, but as the raw material of the present invention, other polymers can be used so long as the expandable beads thereof are available and can be expanded at a temperature above 100°C by steam heating, for instance, copolymers of styrene and other mononer such as acrylonitrile, methyl methacrylate, etc.

What is claimed is:

1. In the known process for the continuous production of a foam product wherein preliminarily expanded beads of polystyrene are formed into a confined moving mass, moving the confined mass of the beads through a heating zone wherein the mass is directly heated with steam so as to cause said mass of beads to reexpand and adhere together, the improvement which comprises:
    a. enveloping the moving mass of the preliminarily expanded beads of polystyrene so as to cover the top, bottom and lateral side surfaces thereof with at least one steam permeable cloth belt having a sufficient width to form overlapping parts of the cloth belt around the exterior surface of the mass of beads,
    b. causing said mass of beads enveloped in steam permeable cloth belt to move through a pressurized steam heating zone which is provided with a pressure sealing zone on both the inlet and the outlet openings thereof,
    c. applying mechanical pressure to said enveloped mass of beads at a point adjacent to the inlet of said pressurized steam heating zone so as to prevent the mass of beads in said envelope from flowing backwards through the enveloping cloth belt,
    d. retaining the enveloped mass of beads in said pressurized steam heating zone for a long enough time to cause reexpansion of the mass of beads,
    e. reducing the reexpanded volume of the mass of beads prior to leaving the pressurized steam heating zone so as to secure the mutual firm adhesion of the beads and to achieve a definite shape for the foamed mass leaving the pressurized steam heating zone,
    f. applying mechanical pressure to the enveloped foamed mass at a point adjacent to the outlet of the pressure sealing zone so as to minimize the leakage of steam from said pressurized steam heating zone,
    g. cooling the enveloped foamed mass, and
    h. separating the enveloping cloth belt from the foamed mass and recovering as a final product a foamed mass of polystyrene.

2. A process according to claim 1 wherein the foamed mass leaving the pressurized steam heating zone is passed into a pressure cooling zone a pressure cooling medium is permeated through the cloth belt and into contact with the foamed mass, and applying pressure to the surfaces of the cooled foamed mass so as to control the tendency of the cooled foamed mass to expand and thereby reduce the sliding resistance of the envelope foamed mass passing through the cooling zone.

3. A process according to claim 1 wherein a steam-permeable liner material is supplied onto at least one of the cloth belts prior to the enveloping of the preliminarily expanded beads and heated by passing through the heating zone together with the beads so that the liner material adheres tightly to the resulting foamed mass.

4. A process according to claim 3 wherein the liner material comprises warped yarns arranged in parallel.

5. A process according to claim 3 wherein the liner material comprises rough non-woven fabric.

6. A process according to claim 1, wherein a plurality of female molds made of an elastomer having cavities corresponding to the desired shaped products are provided on one of said circulating cloth belts, the preliminarily expanded beads are deposited in the cavity of each female mold, another belt is placed over the filled molds, the filled molds are passed through the pressurized steam heating zone and male shaped articles formed in the female molds are withdrawn therefrom.

7. A process according to claim 1 wherein the pressure steam chamber is pressure sealed at the inlet and outlet thereof by passing at least one of the cloth belts enveloping the beads or foamed mass through a zone where mechanical pressure is applied to the sides of the foamed mass so as to form a seal through which steam cannot penetrate.

* * * * *